Dec. 23, 1969          F. S. BUONO              3,485,265
                     THREE-WAY STOPCOCK
                     Filed Dec. 1, 1965
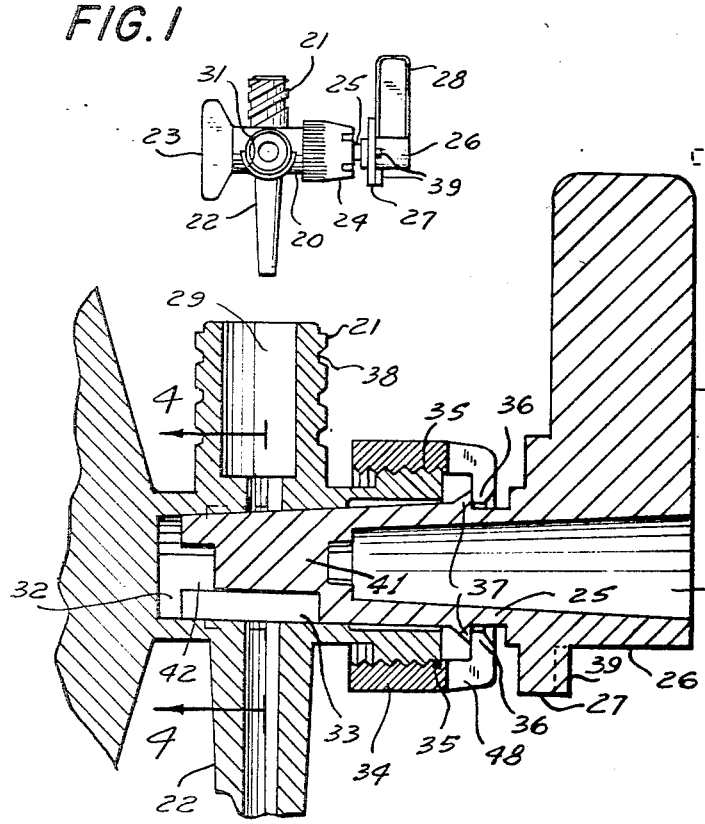
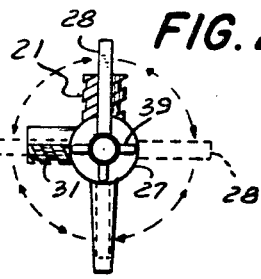
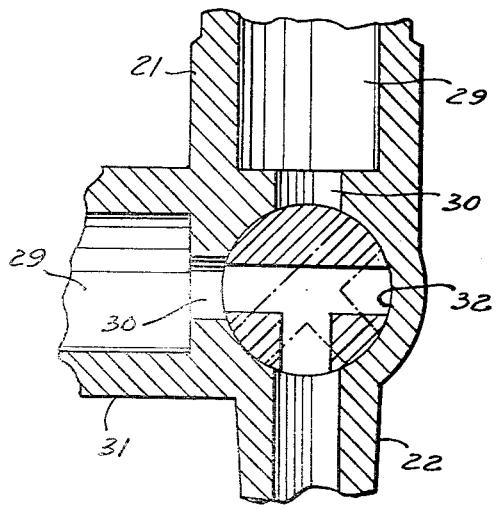
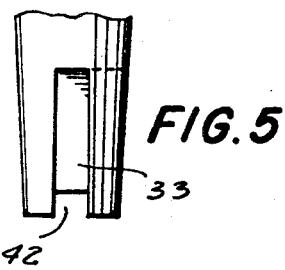
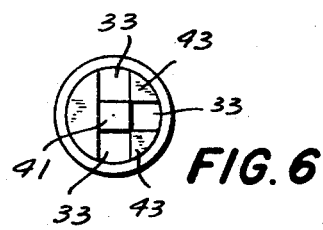
INVENTOR.
FRANK S. BUONO
BY
Kane, Dalsimer, Kane & Smith
ATTORNEYS United States Patent Office 3,485,265
Patented Dec. 23, 1969

1

3,485,265
THREE-WAY STOPCOCK
Frank S. Buono, Garfield, N.J., assignor to Becton Dickinson and Company, Rutherford, N.J., a corporation of New Jersey
Filed Dec. 1, 1965, Ser. No. 526,922
Int. Cl. F16k 11/08
U.S. Cl. 137—556.6                    5 Claims

ABSTRACT OF THE DISCLOSURE

A disposable stop cock including a body with a longitudinally extending tapered bore. A stem having three grooves for passage of fluid at its lower end and a handle at its upper end to rotate the stem is positioned in the bore. A collar connects the stem to the body and cooperates in providing an effective seal therebetween. The body has three bored tubes through which to receive and transmit fluid extending laterally therefrom. The disposition of the bore of the tubes relative to the grooves in the stem is such that relative rotational movement therebetween permits no liquid flow, the flow of at least one liquid, two liquids, and a mixture of the liquids to any of the tubes. The collar and stem have interengaging flanges and an adjustable threaded connection couples the collar to the body. When the collar is threaded to the full extent in one direction, the stem is locked in a substantially fixed position. The handle extends from the stem and is provided with a surface adapted to facilitate manual grasping and rotating of the stem in the body 360 degrees clockwise and counterclockwise to the different flow options.

---

This invention relates to a disposable stopcock adapted to provide a selective and positive flow control of fluids for medical or other applicable use.

In the past and even at present it was customary practice to utilize reusable stopcocks in administration apparatus which were constructed of metal, glass or similar material. Stopcocks of this type present the need for cleaning and resterilization. This endeavor is increased by the presence of multiple parts. Metal and glass stopcocks of multiple parts are also relatively more expensive to manufacture and assemble. These considerations have given rise to concern in this field in view of the ever increasing cost of labor and material.

Stopcocks are often suspended during use, being held in place only by the attaching tubes, which makes adjustment of the stopcock difficult certainly with one hand if not two.

It is therefore an object of this invention to eliminate the above mentioned problems and provide a stopcock which is economical to produce, may be disposed of after single use, and has relatively few parts connected with an effective sealing device.

Another object is to produce a stopcock consisting of only three pieces, all of disposable plastic material, which can therefore be economically manufactured and sold at a reasonable price without affecting the desired performance of the device.

A further object is to provide a keying device that can be firmly grasped and quickly adjusted to four different flow options with an infinite number of settings for each option.

Another object is to provide a keying handle which will rotate the stem a full 360° either clockwise or counterclockwise and one that may shut off flow entirely by rotating the stem either clockwise or counterclockwise from any flow option to any intermediate position between flow options where all flow stops.

2

Another object is to make a grasping device large enough and strong enough to be clamped to lab apparatus to hold the stopcock securely.

Another object is to make a connecting device, which if tightened, is able to lock the key into position to prevent accidental shifting and also, if loosened, will permit effective sterilization and will allow the key to rotate to a new position freely and easily.

A further object is to provide a grasping device on the stopcock to steady it while rotating the key handle to a new position, thereby making the adjustment easier and possible by deploying one hand as well as eliminating the danger of twisting the whole stopcock and connecting tubes while trying to adjust the key or one or more connecting tubes and cause possible failing of a seal between such parts.

A further object is to provide a stopcock which may be locked into the desired setting, any of which may be reached quickly and efficiently.

Still a further object is to provide a stopcock that can be easily disassembled and reassembled which makes for easy resterilization should a user decide to reuse the stopcock.

With these and other objects in mind, reference is had to the attached drawings of the invention in which:

FIG. 1 is a plan view of the invention;

FIG. 2 is a top view of the invention with phantom alternate positions of the key handle with phantom arrows to show the path of movement of the handle to each of the four flow options and showing that the handle may be rotated 360 degrees either clockwise or counterclockwise;

FIG. 3 is a section side view of FIG. 1 with part of the outlet arm and part of the grasping device broken off;

FIG. 4 is a horizontal section view taken along the plane of line 4—4 of FIG. 3 with the outer portions of the three arms broken off, with phantom lines showing one of the intermediate positions at which all flow is shut off;

FIG. 5 is a fragmentary side view of the bottom end of the tapered stem; and

FIG. 6 is the bottom view of FIG. 5.

Basically, the invention is devised to provide a quick and efficient control for the flow of fluids. In FIG. 1 and FIG. 2, the invention is depicted in its assembled state which is comprised of only three parts. One is a body 20 with three projecting arms. Two of the arms 21 and 31 are of larger diameter than the third 22 and have a threaded outer surface; 21 being threaded on its entire outer circumference, and 31 being threaded on only half of its outer circumference. A grasping device 23 is also part of the body. The second part is an adjustable collar 24 which connects the body to the third part which is the stem and keying member 25. The third part consists of the stem 25, the head of the stem 26, and indicating dial 27 showing the direction of the open positions and a handle to change the open positions. FIG. 2 depicts the rotation of the handle to other locations which produces a different flow pattern.

All of the parts are preferably constructed of a disposable plastic material that may be discarded after single use to avoid the cleaning and resterilization of the stopcock. Being of only a few parts, it is economical and easy to manufacture. The parts may be easily disassembled and reassembled to facilitate resterilization in case the user desires to resterilize the stopcock.

FIG. 4 shows the possible flow positions that can be obtained. In the position depicted, the tube of narrow diameter 22 is open and one of the tubes of wide diameter 31 is open. Large diameter tube 21 is closed. By rotating the stem 25 in either direction either tube 22 or tube 31 may be closed, alternatively all three tubes can be open or all three tubes can be closed as depicted, for example, by the phantom lines. This presents a stopcock with four different flow patterns that can be changed by turning the stem. It is therefore possible to administer either of two fluids, a mixture of both or none of either kind quickly and efficiently.

Tube 31 and tube 21 which are of a large diameter 29 narrow into a diameter 30 equal to the diameter of tube 22 before entering the chamber 32 of the body. This insures proper fluid flow.

By turning the handle 28 which is part of the stem 25, the grooves 33 in the bottom end of the stem are rotated to a new location (see FIG. 3). These grooves are the passages to allow the fluid to flow from one tube to another. The fluid flows from the inlet tube through the groove passage into the chamber below the stem in the body into another groove passage and out the outlet tube.

To present a sealed connection between the stem and the body, an adjustable collar is used. The collar 24 is mounted on the stem and then threaded on the body which is provided with a threaded flange 35 to receive the collar. By rotating the collar 24 it moves axially on the body and draws the tapered stem into the body and forms a tight seal. Rotating the collar 24 to its limit axially down the body locks the stem in that position. The handle 28 cannot then be accidentally turned to a different position.

The collar 24 is composed of a tapered upper portion 48 and a cylindrical lower portion 34 the surface of which is knurled or serrated to facilitate a grasping and rotating of the collar. As the collar 24 is threaded axially on the threaded flange of the body, the lower edge of the tabs 36 of the collar will press down on the flange of the stem 37 forcing the tapered stem into the tapered body, the entire action forming an effective seal. Rotating the collar 24 to its full extent locks the stem into that position.

The drawing in FIG. 3 shows the internal portion of the body 20. It contains a tapered bore to receive the stem, extending from the threaded flange 35 at the top to the bottom which is closed. At the bottom of the body is the grasping device 23 which allows the operator to hold the stopcock steady while adjusting. This also prevents the danger of twisting the entire stopcock and disconnecting a tube connection.

The radial tubes 21, 31 and 22 for receiving and transmitting fluids extend from the body. The two large diameter tubes 21 and 31 incorporate a threaded or grooved outer surface 38 to provide a better grasping surface for a connection. Tube 31 has only a half thread over its outer surface to facilitate the molding process, but it has been found that this half thread functions equally as well as a full thread. The third tube 22, which is of narrower diameter, and has no thread on its outer circumference, provides for a different type connection.

The stem has a handle 28, with a surface to facilitate grasping and turning, which is used to rotate the stem. This handle also indicates the closed tube by serving as a pointer. The handle sits on a circular dial 27 on the head of the stem. This dial also contains three other indicators 39 which point out the open tubes. The stem is hollow and contains a tapered bore 40 which is open at the top but is closed at the bottom ending within the stem. The stem does not reach to the bottom of the body which leaves a chamber 32 for the fluid to flow through the stopcock.

The lower end of the stem is displayed in FIG. 5 and FIG. 6, which shows the three grooves cut out of the stem for the passage of fluid in the stopcock. The grooves are parallel to the axis of the stem. The rectangular piece in the center 41, which is left after the grooves are cut, does not extend to the bottom of the stem. This leaves an additional section of area 42 for the fluid to pass through at the bottom before leaving the stem. This section 42 acts as a safety chamber through which the fluid may flow if the stem ever extends to the bottom of the body which would eliminate the flow chamber 32. The rectangular section 41 extends part of the length of the stem to lend support to the portion of the stem 43 that separates the grooves 33. The grooves 33 make it possible to have four different flow patterns without an addition of another part. Only a twist of the handle, either clockwise or counterclockwise, is necessary to arrive at any of the four flow patterns, or a shut-off position where there is no flow.

I claim:

1. A one-time use stopcock composed entirely of disposable plastic materials and to be used for controlling the flow of fluids, said stopcock comprising a body having a longitudinally extending tapered bore, a stem in the bore having three grooves for the passage of fluid at the lower end and a handle at the upper end to rotate the stem which keys the different flow patterns, a collar mounting the stem in the bore of the body, said collar cooperates in providing an effective seal between the stem and body, the body having three bored tubes through which to receive and transmit fluid extending laterally from the body, the disposition of the bore of the tubes relative to the grooves in the stem being such that relative rotational movement therebetween permits no liquid flow, the flow of at least one liquid, two liquids, and a mixture of said liquids to any of said tubes, said collar and stem having interengaging flanges, an adjustable threaded connection couples said collar to the body and when said collar is threaded to the full extent on the body the stem is forced further inward into the bore of the body through the interengagement of the flanges to lock the stem in a substantially fixed position, and said key handle extending from said stem and being provided with a surface adapted to facilitate manual grasping and rotating of the stem in the body 360° clockwise and counterclockwise to the different flow options.

2. A stopcock in accordance with claim 1 wherein a grasping device is located on the body for steadying the stopcock during operation.

3. The invention in accordance with claim 1 wherein the body between adjacent tubes is provided with means for sealing said grooves to prevent liquid flow from the tubes into the grooves.

4. A stopcock in accordance with claim 1 wherein at least one of the tubes includes a thread means extending circumferentially partly around the outer surface of the tube to facilitate having a strong connection with another tubular member and to facilitate the molding of the stopcock.

5. The invention in accordance with claim 1 wherein there are indication means on the stem adjacent the handle to indicate the orientation of the grooves relative to the tubes.

References Cited

UNITED STATES PATENTS

| 117,853 | 8/1871 | Allen | 251—352 |
|---|---|---|---|
| 260,615 | 7/1882 | Seabury | 137—625.41 |
| 1,258,235 | 3/1918 | Malm | 251—345 |
| 3,185,179 | 5/1965 | Harautuneian | 137—625.47 |
| 3,124,335 | 3/1964 | Mason | 251—368 |

FOREIGN PATENTS 177,085  12/1953  Austria.

HENRY T. KLINKSIEK, Primary Examiner

U.S. Cl. X.R.

137—625.41; 251—188